Oct. 10, 1961  F. C. WHITEHEAD  3,003,401
SCREW THREAD MATCHING DEVICE FOR MILLING MACHINES
Filed Feb. 5, 1958  3 Sheets-Sheet 1

INVENTOR
F. C. WHITEHEAD
BY
Joseph H. Schofield
ATTORNEY

Oct. 10, 1961   F. C. WHITEHEAD   3,003,401
SCREW THREAD MATCHING DEVICE FOR MILLING MACHINES
Filed Feb. 5, 1958   3 Sheets-Sheet 2
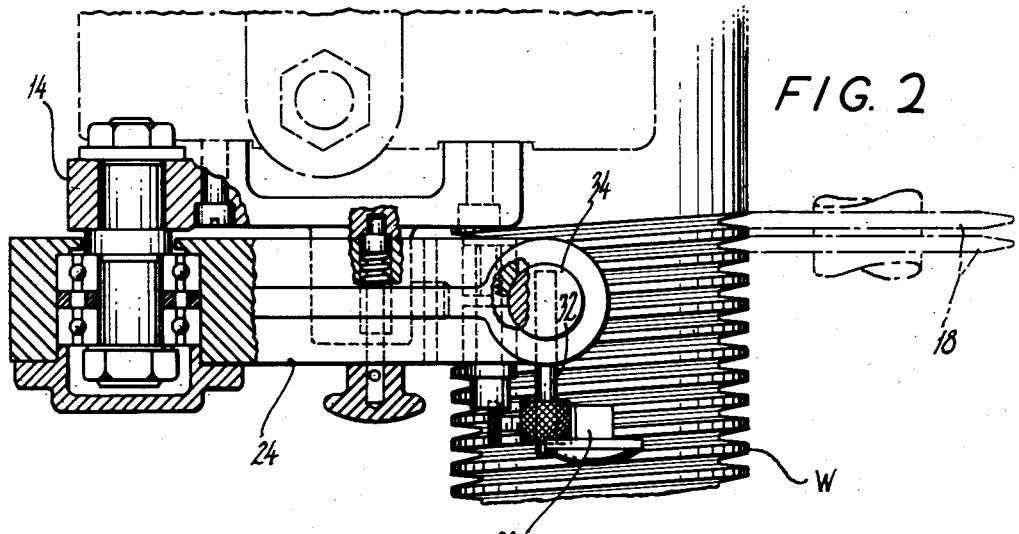
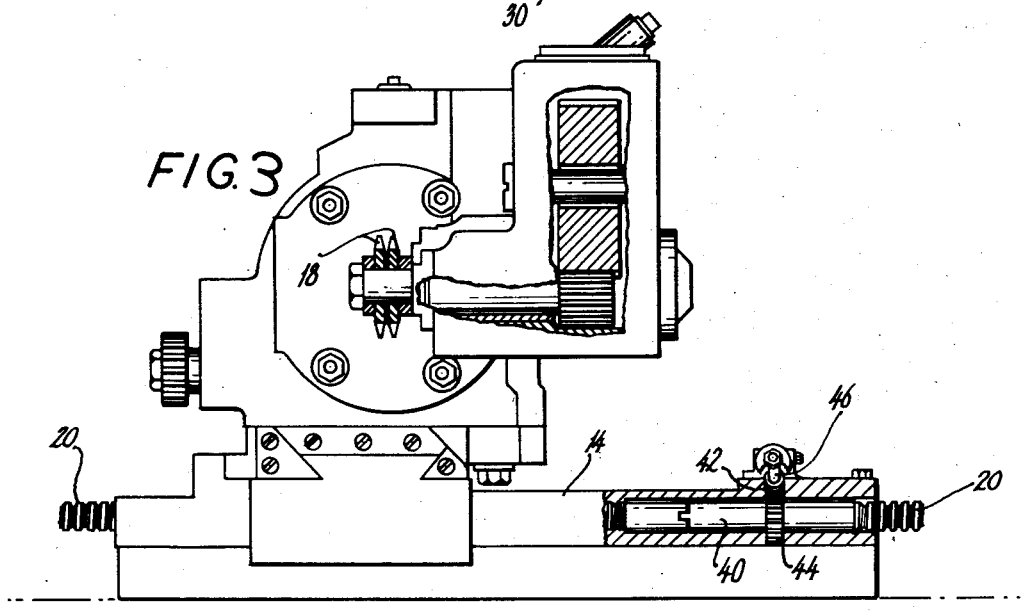
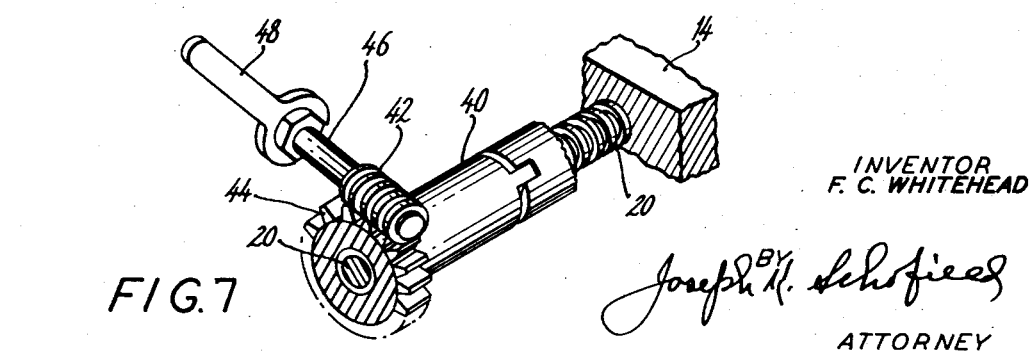
INVENTOR
F. C. WHITEHEAD
ATTORNEY Oct. 10, 1961   F. C. WHITEHEAD   3,003,401
SCREW THREAD MATCHING DEVICE FOR MILLING MACHINES
Filed Feb. 5, 1958   3 Sheets-Sheet 3

INVENTOR
F. C. WHITEHEAD
BY
ATTORNEY

United States Patent Office 3,003,401
Patented Oct. 10, 1961

3,003,401
SCREW THREAD MATCHING DEVICE FOR MILLING MACHINES
Frederic C. Whitehead, Newington, Conn., assignor to Pratt & Whitney Company, Incorporated, West Hartford, Conn., a corporation of Delaware
Filed Feb. 5, 1958, Ser. No. 713,487
6 Claims. (Cl. 90—11.66)

This invention relates to thread milling machines and more particularly to means for obtaining continuous threads when advancing the work being threaded to successive positions relative to the tool carriage is necessary due to the length of the threaded portion of the work exceeding the length of travel of the tool carriage.

A primary object of the present invention is to enable a work piece to be accurately threaded for its entire length when it is required to reposition the work in the machine to successive axial positions to accomplish a continuous thread cutting operation along the entire length of the threaded portion of the work piece.

A feature that enables the above object to be accomplished is that the cutter supporting carriage of a standard thread milling machine is provided with a bracket pivotally mounted for movement about an axis parallel to the direction of movement of the cutter carriage and of the work piece so that the bracket may conveniently be moved to operative and inoperative positions. Mounted on this bracket is an indicator preferably of the dial type, the pointer or work contacting member of which, in the operative position of the bracket, engages a flank of the screw threads being milled. In the inoperative position of the bracket the indicator is out of engagement from the work so that the work, after disengaging the cutters, may be advanced axially along the ways of the machine and reclamped in a new axial advanced position.

Another feature of importance of the invention is that manual means are provided supplementary to rotation of the lead screw of the machine to advance the cutter carriage slightly in either direction, these means including manual means to rotate the nut mounted within the carriage and engaging the lead screw.

With the above and other objects in view, the invention consists in the features of construction and operation set forth in the following specification and illustrated in the accompanying drawing.

In the drawing:

FIG. 2 is a plan view on an enlarged scale relative to FIG. 1 showing the principal parts of the indicator positioning means on the cutter carriage.

FIG. 3 is a front elevation of the rear portion of the cutter carriage showing the mounting for the threading cutter and the means to adjust the longitudinal position of the cutter carriage relative to the milling machine and lead screw.

FIG. 7 is a detached view of mechanism by means of which the longitudinal position of the carriage may be manually adjusted slightly by rotation of its member engaging the lead screw.

In the operation of threading long precision screws such as those required as lead screws in machine tools, it is impractical to use a milling machine having a carriage travel sufficiently long to form the screw threads for the entire length of the work piece in one setting. It is therefore necessary to form or cut a section of the screw threads as long as permitted by the carriage travel and then reposition the work piece to a new advanced axial position and move the cutter carriage in the same direction so that a new section of the work piece may be threaded. It will be obvious that unless particular care is taken to properly position the cutter relative to the work the successive milled portions of the screw threads will not be continuous to the precision required by modern practice. It is the primary function, therefore, of the present invention to provide means whereby successive portions of an elongated screw threaded portion of a work piece may be milled so that each axial section will be continuous with sections previously milled.

Figure 1:
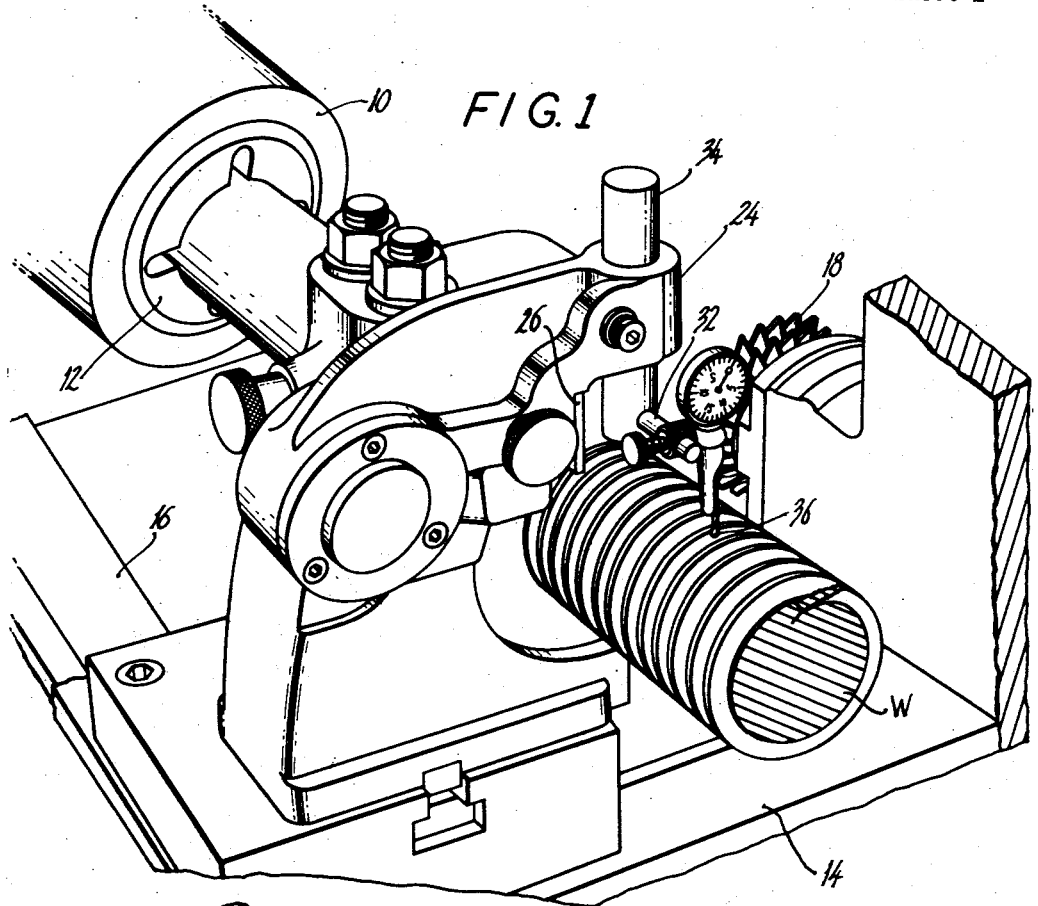
FIGURE 1 is a perspective view of the operative parts of a screw thread milling machine showing the dial indicator in its operative position engaging the screw threads being milled.
Figure 6:
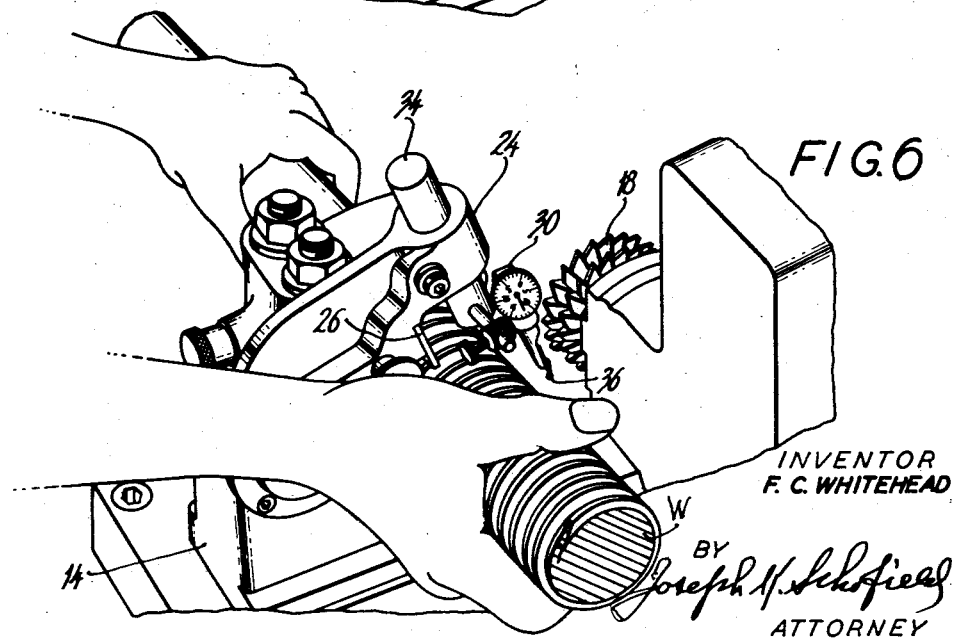
FIG. 6 is a perspective view showing the bracket and its indicator in inoperative positions and the work piece being advanced longitudinally of the machine.
Figure 4:
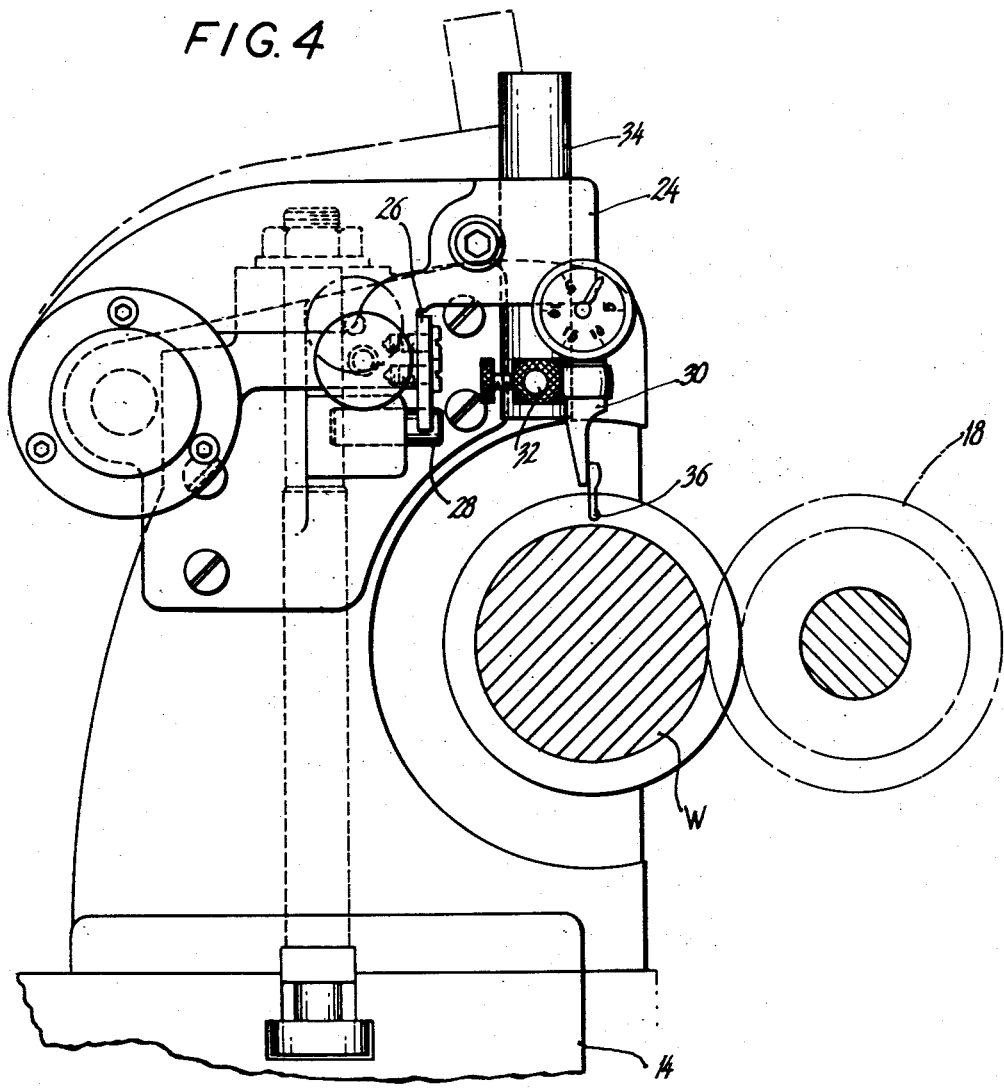
FIG. 4 is a side view of the bracket and indicator showing the indicator in its operative position relative to the work piece being threaded.
Figure 5:
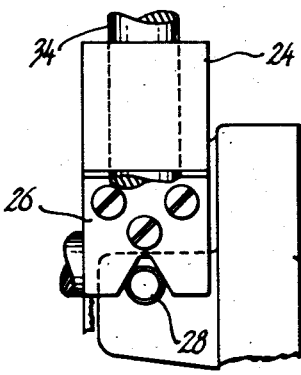
FIG. 5 is an elevation of a detail of the positioning means for the bracket shown in FIG. 4.

Referring more in detail to the figures of the drawing, FIG. 1 shows a perspective view of the principal portions of a thread milling machine having a supporting and rotating member for the work piece W being threaded such as a work spindle 10 and chuck 12 in a suitable headstock (not shown) at one end of the machine. The machine may be substantially of the type shown in the patent to Moyer 1,545,681, granted July 14, 1925, which will not require specific description. It will be sufficient to state that the work piece W is supported and rotated upon a fixed axis extending longitudinally along the base of the machine and that the cutter carriage 14 is movable along ways 16 on the machine in a direction parallel to the axis of rotation of the work piece W. For this purpose a lead screw 20 is provided as shown in FIG. 3 driven in timed relation to the work rotation. The cutter may be in the form of one or two milling cutters 18 of truncated sectional form mounted on the rear portion of the cutter carriage 14 and rotated by any appropriate means, at an appropriate speed.

The first operation on an elongated work piece having screw threads extending substantially its entire length is to mount the work piece W so that the initial threading operation may be started at one end thereof and the threading operation continued in the usual manner until the carriage 14 has reached the opposite end of its travel. To continue the threading operation along the work piece W it then will be necessary to disengage the cutter or cutters 18 from the work piece, release the work piece from its rotating member 12 and advance it axially, usually manually, so that the end of the threaded portion will be at the opposite end of the cutter carriage travel. The tool carriage 14 also must be actuated by the lead screw 20 to move the carriage to the opposite end of its travel with the work piece disengaged from its chuck 12. The cutters 18 must then again engage the work piece W substantially at the end of the previously threaded portion so that the milling cutters 18 will continue their threading operation in accurately justified position to form a continuous thread.

On the cutter carriage 14 is a bracket 24 pivotally mounted upon an axis parallel to the axis of rotation of the work piece W and movable into a fixed operative position, means being provided for that purpose comprising a notched member 26 on the carriage 14 and a bar or rod 28 on the bracket 24 so that the bracket will rest with its bar or rod 28 in the notch formed by the V-shaped member 26. Also mounted on the bracket 24 is a support for an indicator 30 preferably of the dial type. This indicator 30, as shown most clearly in FIG. 1, is mounted adjustably on a small bar 32 extending parallel with the work piece W and this bar in turn is mounted on a rod 34 movable vertically at right angles thereto. By these members 32 and 34 adjustments of the dial indicator 30 may be effected longitudinally of the work piece W and also radially thereof for screw threads of different diameter. The pointer or work contacting member 36 of the dial indicator 30 is resiliently mounted relative to the indicator body and, as shown, is positioned to rest upon a flank of the screw threads being milled.

In the use of this device, at the end of one complete travel movement of the cutter carriage 14 during which a portion of the screw threads are formed, rotation of the work W is stopped and the dial indicator 30 is swung to its operative position by bracket 24 to engage a flank surface of the milled screw thread adjacent the end of the threads just finished. The indicator 30 then is adjusted so that its pointer will point to zero on its scale when its contact point 36 is in engagement with the flank surface of the screw thread being milled. The bracket 24 is then swung to its inoperative position, thus disengaging the dial indicator 30 from the work piece W. The chuck 12 is released and with the cutters 18 disengaged from the work W, the work W is manually advanced axially until the unthreaded portion of the work piece is adjacent the tailstock end of the machine. The cutter carriage 14 is then traversed axially toward the tailstock end and the work piece W again engaged with its chuck 12. The bracket 24 is then lowered to its operative position. Manually thereafter the tool carriage 14 is axially adjusted slightly by means shown in FIGS. 3 and 7 to a position along the ways 16 so that the dial indicator 30 will engage a flank of the screw threads and its pointer reads zero.

With this accomplished the bracket 24 is moved to its inoperative position, the cutters 18 advanced into their cutting position and the milling operation resumed from the end of the screw threads previously milled. This repositioning operation may take place as many times as required by the length of the screw threads on the work piece and each milled section of the screw thread will be continuous with the previously milled portions.

As shown in FIGS. 3 and 7, a lead screw engaging nut 40 is housed within the tool carriage 14 and maintained against axial movement relative to the carriage. This nut 40 may be manually rotated on its lead screw 20 as shown by a worm 42 engaging a worm wheel 44 on the nut 40. The worm 42 is carried on the inner or rear end of a short shaft 46 extending forwardly. At the forward end of the shaft 46 is a squared portion permitting a wrench 48 to be mounted thereon to adjust the rotative position of the worm 42 and of the nut 40 engaging the lead screw 20. The carriage 14 may therefore be moved while its lead screw 20 is not being rotated in either direction along its ways 16.

By means of this manual adjustment of the nut 40 by rotation of the worm shaft 46 the position of the work contacting member 36 of the indicator 30 can be adjusted to the zero position on its scale. With this member 36 so adjusted the carriage 14 and its cutters 18 will be in the correct position to resume thread cutting operations to form a precise continuation of the screw threads previously milled.

These adjustments of the carriage 14 by manual adjustment of nut 40 are made while the work W is slowly rotating and while the carriage is being advanced by lead screw 20. The cutters 18, however, are disengaged from the work. Final adjustments to start threading a new section of the work W can be completed closely adjacent the end of the previously threaded portion.

I claim:

1. A tool locating means for thread milling machines comprising a base, a work supporting and rotating member thereon, means in said supporting and rotating member to permit advancement of a work piece therein to successive axial positions, a cutter carriage having limited sliding movement on said base, said carriage being movable in a direction parallel to the axis of rotation of said work supporting and rotating member, a cutter thereon, a bracket pivotally mounted on said cutter carriage, an indicator adjustably mounted on said bracket, a resiliently mounted work contacting member on said indicator, and means to axially adjust the position of said cutter carriage when in successive axially advanced operating positions of the screw threads being formed in accordance with the indication of said work contacting member.

2. A tool locating means for thread milling machines comprising a base, a work supporting and rotating member thereon, means in said supporting and rotating member to permit advancement of a work piece therein to successive axial positions, a cutter carriage having limited axial movement for cutting a continuous thread on a work piece longer than the carriage movement, said carriage being movable in a direction parallel to the axis of rotation of said work supporting and rotating member, a cutter thereon, means permitting axial repositioning of said work piece, a bracket pivotally mounted on said cutter carriage, an indicator adjustably mounted on said bracket, a resiliently mounted work contacting member on said indicator, said contacting member engaging a flank portion of the threads being formed, said work contacting member indicating the axial position of said cutter carriage relative to said screw threads when in successive engaging positions with the screw threads being formed.

3. A tool locating means for thread milling machines comprising a base, a work supporting and rotating member thereon, a cutter carriage, said carriage being movable in a direction parallel to the axis of rotation of said work supporting and rotating member, a cutter thereon, means permitting axially repositioning of the work in said work supporting and rotating member in successive axially advanced positions, a bracket pivotally mounted on said cutter carriage, an indicator adjustably mounted on said bracket, a resiliently mounted work contacting member on said indicator, said contacting member engaging said work in each successive axial reposition of said work, and means to indicate the axial position of said cutter carriage relative to said screw threads in each successive advanced operative position of the screw threads being formed.

4. A tool locating means for thread milling machines comprising a base, a work supporting and rotating member thereon, a cutter carriage having a cutter thereon movable in a direction parallel to the axis of rotation of said work supporting and rotating member, a bracket pivotally mounted on said cutter carriage, an indicator adjustably mounted on said bracket, a resiliently mounted work contacting member on said indicator, and means to indicate the axial position of said cutter carriage relative to said screw threads when said work contacting member is in successive axially advanced positions of the screw threads being formed.

5. A tool locating means for thread milling machines comprising a base, a work supporting and rotating member thereon, a cutter carriage having limited movement for cutting a continuous thread on a work piece longer than the carriage travel having a cutter thereon movable in a direction parallel to the axis of rotation of said work supporting and rotating member and in timed relation to the rotation thereof, means permitting axial repositioning of said work, a bracket pivotally mounted on said cutter supporting carriage upon an axis parallel to the axis of rotation of the work, an indicator on said bracket adapted to engage the flank of a thread in each successive axial position of said work, a resiliently mounted work contacting member on said indicator, means to indicate the axial position of said contacting member when in engagement with the work, and means to axially adjust said cutter carriage supplementary to said carriage moving means.

6. A tool locating means for thread milling machines comprising a base, a cutter carriage thereon having limited axial carriage movement for cutting a continuous thread on a work piece longer than said carriage movement, comprising work supporting and rotating means, a cutter carriage having a rotating cutter thereon movable in a direction parallel to the axis of rotation of said work supporting and rotating means and in timed relation to the rotation of said work, means permitting adjustment of said work to successive axially advanced positions, manually operated means supplementary to said carriage moving means to adjust the axial position of said cutter with respect to said carriage, a bracket pivotally mounted on said carriage, an indicator on said bracket comprising dial means and a resiliently mounted work contacting member adapted to engage the flank of a thread in each successive axially advanced position of said work, said dial means visually indicating the axial position of said cutter when said contacting member is in engagement with the work, whereby when the thread and said work contacting member are in the same relative position as the work contacting member and a thread in the previous advanced axial position of the work, the cutter will be properly repositioned for cutting a continuation of the previously cut thread.

References Cited in the file of this patent

UNITED STATES PATENTS

| | | |
|---|---|---|
| 631,770 | Bailey | Apr. 29, 1899 |
| 1,359,943 | Wilhelm | Nov. 23, 1920 |
| 1,404,545 | Richardson | Jan. 24, 1922 |
| 2,409,924 | Bauer | Oct. 22, 1946 |
| 2,433,468 | Mackmann et al. | Dec. 30, 1947 |
| 2,640,274 | Crosby | June 2, 1953 |
| 2,749,807 | Burgsmuller | June 12, 1956 |